United States Patent [19]

Marvell et al.

[11] Patent Number: 4,940,375
[45] Date of Patent: Jul. 10, 1990

[54] CLINCH TYPE FASTENER STRUCTURE AND TOOLING

[75] Inventors: Michael D. Marvell, Rockford, Ill.; John S. Milliser, Rochester, Ind.

[73] Assignee: Textron Inc., Providence, R.I.

[21] Appl. No.: 354,640

[22] Filed: May 19, 1989

[51] Int. Cl.[5] .................. F16B 37/04; B23P 11/00
[52] U.S. Cl. ................................... 411/181; 411/179; 29/432.2; 29/512
[58] Field of Search ............... 411/173, 179, 181, 183, 411/967, 968; 29/432.2, 512

[56] References Cited

U.S. PATENT DOCUMENTS

| | | | |
|---|---|---|---|
| 1,112,525 | 10/1914 | Darling | 411/181 |
| 1,332,687 | 3/1920 | Reynolds | 411/179 |
| 3,405,752 | 10/1968 | Neuschotz | 411/181 |
| 3,800,401 | 4/1974 | Jesevich et al. | 29/432.2 |
| 3,877,133 | 4/1975 | Grube | 29/432.2 |
| 3,967,669 | 7/1976 | Egner . | |
| 4,389,766 | 6/1983 | Capuano | 411/179 |
| 4,555,838 | 12/1985 | Muller | 411/179 |
| 4,637,766 | 1/1987 | Milliser | 411/180 |

Primary Examiner—Neill R. Wilson
Attorney, Agent, or Firm—R. A. Giangiorgi

[57] ABSTRACT

An improved joint structure and tooling apparatus are provided for assembling a self-clinching fastener to sheet material, particularly sheet metal. The fastener includes head and shank portions with an intermediate locking groove formed in the shank. The fastener shank projects through the aperture and the head is at least partially embedded within the peripheral material surrounding the sheet metal aperture. A portion of the peripheral sheet metal is disposed within the groove to form a mechanical interlock for securement of the joint assembly. The shank has an outwardly flared end portion which is staked so that it has an exposed surface coplanar or flush with the exposed, opposite surface of the sheet material relative to the embedded fastener head, which provides a smooth continuous undersurface of the joint. In a preferred embodiment, the flattened and staked end portion of the shank clamps the peripheral sheet material against the fastener head adjacent to the grooved mechanical interlock to further promote securement of the joint assembly for particular resistance to side loads or shear forces on the joint assembly in subsequent use. In another aspect of the invention, the tooling apparatus for securing the self-clinching of the fastener to the apertured sheet material comprises a die member for supporting the apertured sheet metal and includes a projecting cam portion for staking the fastener.

9 Claims, 1 Drawing Sheet

U.S. Patent   Jul. 10, 1990   4,940,375
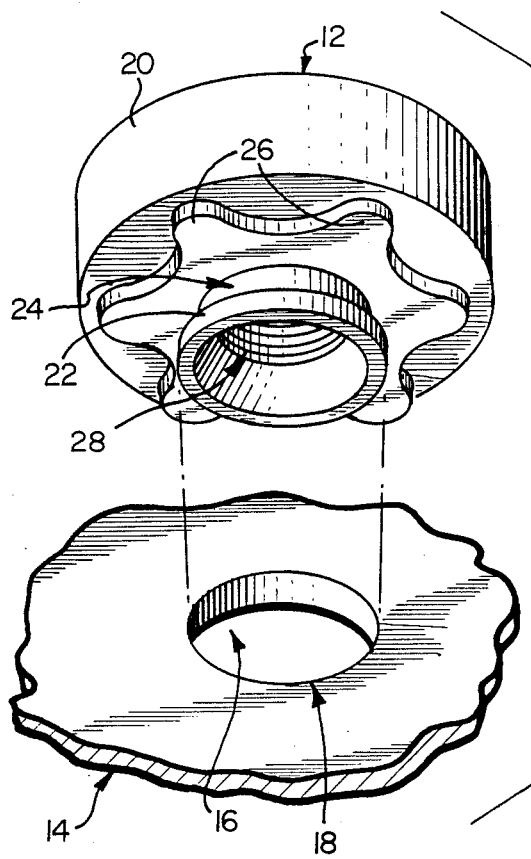
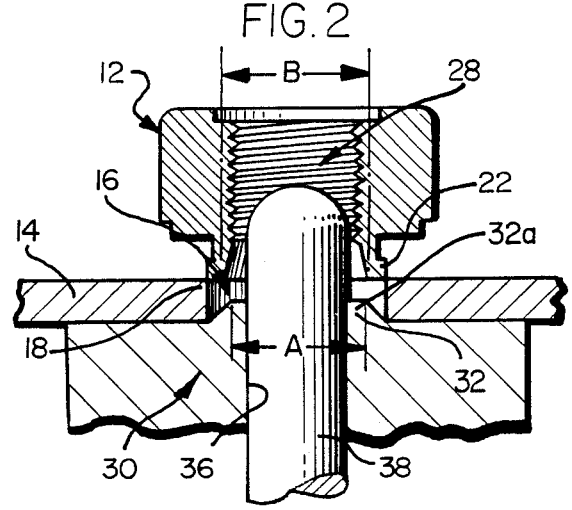
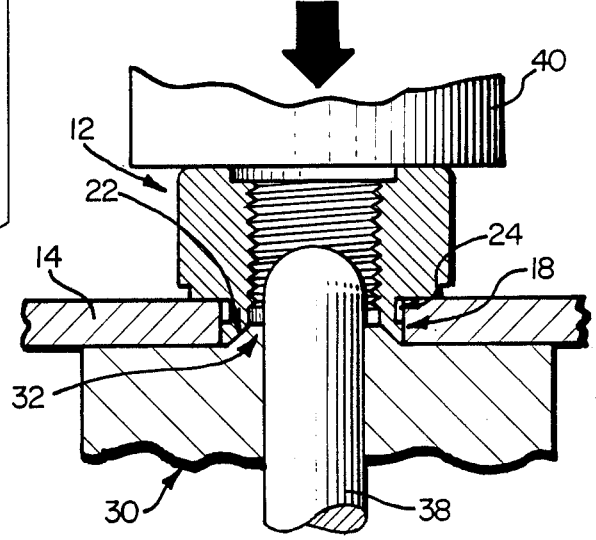
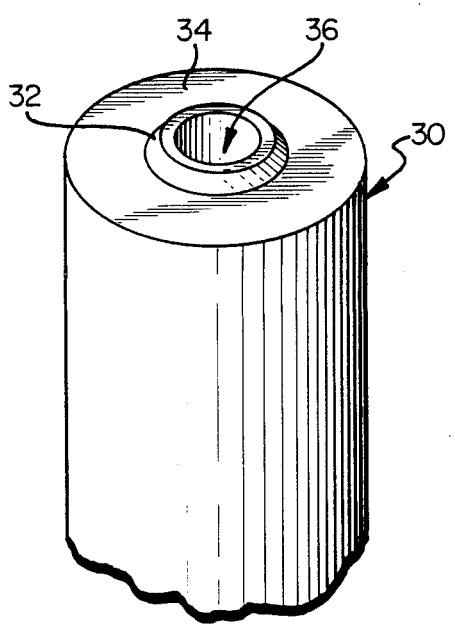
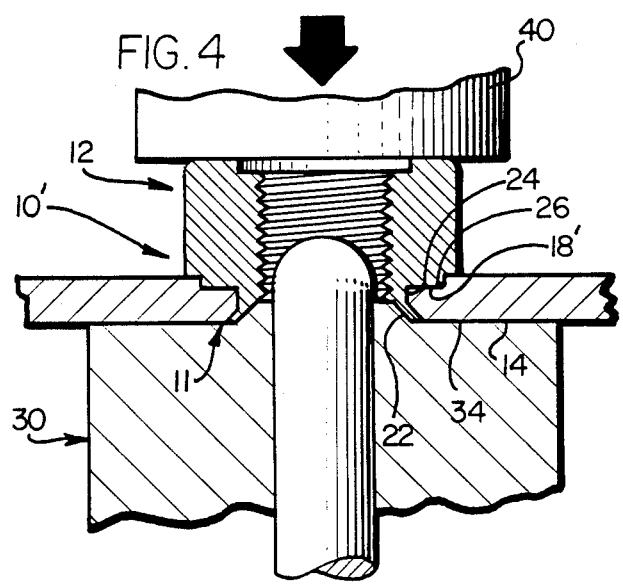

CLINCH TYPE FASTENER STRUCTURE AND TOOLING

BACKGROUND OF THE INVENTION

This invention relates to self-clinching fasteners and assembly thereof with thin sheet materials such as sheet metal.

Self-clinching fasteners for typical sheet metal have been developed particularly for applications in which welding or threading are undesirable as the primary means of securing the joint, such as the self-clinching fasteners marketed under the trademark STRUX. For example, U.S. Pat. No. 3,967,669 describes fasteners having an enlarged head and a shank portion having a tapered extruding section of the type installed in a prepunched hole in the sheet metal which may be smaller than the extruding section of the shank. The shank extruding section is inserted and deforms a portion of the periphery of the sheet metal aperture to resize the aperture, preferably resulting in a rim formation on the aperture with the aperture walls closely overlying the retaining groove in the fastener. As the fastener head is driven into the sheet metal, the rim or aperture material is displaced radially inwardly to fill the annular retaining groove provided in the fastener shank below the head which produces a firm mechanical interlock. In addition, the fastener head may include a plurality of radially arranged projections which, when embedded in the sheet material, prevent relative rotation and provide high torque resistance between the fastener and the sheet metal, particularly when the fastener is internally threaded to accept a second threaded fastener driven into the clinched fastener in a subsequent mounting operation.

SUMMARY OF THE INVENTION

In accordance with aspects of the present invention, an improved joint structure and tooling apparatus are provided for assembling a self-clinching fastener to sheet material, particularly sheet metal. The fastener includes head and shank portions with an intermediate locking groove formed in the shank. The fastener shank projects through the aperture and the head is at least partially embedded within the peripheral material surrounding the sheet metal aperture. A portion of the peripheral sheet metal is disposed within the groove to form a mechanical interlock for securement of the joint assembly. The shank has an outwardly flared end portion which is staked so that it has an exposed surface coplanar or flush with the exposed, opposite surface of the sheet material relative to the embedded fastener head, which provides a smooth continuous undersurface of the joint. In a preferred embodiment, the flattened and staked end portion of the shank clamps the peripheral sheet material against the fastener head adjacent to the grooved mechanical interlock to further promote securement of the joint assembly for particular resistance to side loads or shear forces on the joint assembly in subsequent use.

In another aspect of the invention, the tooling apparatus for securing the self-clinching of the fastener to the apertured sheet material comprises a die member for supporting the apertured sheet metal during the tooling operation to clinch and secure the fastener. The die member includes a projecting cam portion for staking the fastener, and the cam portion axially extends from a radially larger end surface on the die member which supports the sheet material during the staking operation. In a preferred embodiment, the cam portion of the die member has a conical configuration tapering with the axial extension in order to enable pilot insertion of the conical cam portion into the central end opening of the annular shank wall of the fastener which radially displaces the shank wall during the clinching and securement of the fastener to the sheet material. The die member can also include an axially extending bore which opens through the cam portion to allow selective projection of a guide member from the bore for guiding alignment of the fastener with the sheet material aperture in the staking operation.

BRIEF DESCRIPTION OF THE DRAWING

FIG. 1 is a perspective view of a self-clinching fastener nut and an apertured section of sheet metal which are assembled to form a joint in one embodiment of the invention;

FIG. 2 is a vertical, sectional view of an embodiment of the tooling apparatus of the invention as the staking and clinching operation is initiated to assemble the joint assembly from the fastener and sheet material shown in FIG. 1;

FIG. 3 is a vertical, sectional view sequentially following FIG. 2 in the progressive assembly operation initiated in FIG. 2;

FIG. 4 is a vertical, sectional view showing the completed joint assembly resulting from continuation of the operation shown in FIGS. 2 and 3; and FIG. 5 is a perspective view of the lower staking die shown in FIGS. 2-4.

DESCRIPTION OF THE ILLUSTRATED EMBODIMENTS

Referring now specifically to the drawings, FIG. 1 illustrates a preferred form of a fastener assembly of the invention immediately prior to formation of the fastener and sheet metal joint, which assembly is generally designated by reference 10. The assembly 10 includes a unitary fastener nut 12 and an apertured sheet material 14 such as thin gauge sheet metal, which are shown unassembled in FIG. 1 in order to illustrate the structural features prior to joining to form the complete assembly joint 10, illustrated in FIG. 4. The sheet metal 14 is prefabricated to form a through aperture 16 having a circular periphery 18 in the illustrated embodiment.

The fastening nut 12 is of a self-clinching type and may be constructed in accordance with the teaching of U.S. Pat. No. 3,967,669. The nut 12 includes an enlarged head 20 and an out-turned, annular lip 22 which forms the terminal shank end in the embodiment of the nut 12 illustrated in FIG. 1. An intermediate shank portion is provided which includes an annular locking groove 24 more fully described in the aforementioned U.S. Pat. No. 3,967,669, the disclosure of which is incorporated herein by reference. The locking groove 24 has a volume which is selected such that the amount of material displaced upon sealing of the fastener 12 will completely fill the groove to achieve the desired mechanical interlock shown in FIG. 4.

The underside of the nut head 20 has a plurality of radially disposed protuberances or lobes 26 which embed in the upper surface of the aperture periphery 18 as shown in FIG. 4, to form additional mechanical interlock therewith which prevent or resist relative rotation of the nut 12 with respect to the aperture periphery 18 and sheet metal 14 generally. In the illustrated embodiment, the nut 12 has a central, through bore 28 which can be threaded or unthreaded (not shown) depending upon the ultimate application of the fastener assembly. In some applications, an unthreaded nut will be tapped subsequent to mounting and clinching the fastener assembly 10'. Such a tapping operation will require high torque resistance provided by the mechanical interlock produced by the embedded lobes 26.

In order to mount and clinch the fastener nut 12 within the aperture 18 and sheet metal 14, a cold-forming and staking operation is performed as described with reference to FIGS. 2–4. In the staking operation, the sheet metal 14 is supported on a lower staking die 30 which is also shown in FIG. 5. The staking die 30 has a generally cylindrical configuration and has a generally truncate conical staking cam formation 32 which axially projects centrally from a radially larger annular end face 34 of the cylindrical die 30. The die 30 also has an axially extending central bore 36 which opens through the cam formation 32.

Referring again to FIG. 2, to begin the staking operation, the sheet metal 14 is seated and supported on the surface of the annular die face 34 so that the cam formation 32 projects upwardly into the sheet metal aperture 16. In the preferred embodiment illustrated, a guide pin 38 is installed within the bore 36 and projects upwardly through the cam 32 and the sheet metal aperture 16 so that it extends above the sheet metal 14; the upwardly projecting pin 38 provides guidance for locating the fastener nut 12 by further projecting into the nut bore 28 which thus properly aligns the nut 12 with the aperture 16 when the nut is mounted on the guide pin 38 to begin the staking operation. The pin 38 can be axially movable for retraction by supporting its lower end on a biasing spring (not shown).

The annular nut lip 22 serves as a sizing ring which is downwardly forced through the sheet metal aperture 16 of somewhat smaller diameter by cold-displacing and resizing the aperture diameter and periphery 18 to ensure completely filling the locking groove 24 with peripheral material as more fully described hereinafter. It is particularly important that the annular end wall 32a of the conical cam formation 32 have an outer diameter, reference dimension A, which is approximately the same or slightly less than the inner diameter, designated B, of the annular nut lip 22 so that when the nut 12 is forced downwardly by ram 40 or similar tooling as shown in FIG. 3, the conical cam 32 can be forced to enter the mouth of the annular lip. Continued downward ramming of the nut 12 as shoWn in FIG. 3 not only forces the cam formation 32 upwardly through the nut lip 22, but in addition, because the cam 32 conically increases in diameter, the cam progressively forces a radially outward displacement of the material of the nut lip 22 resulting in a cold-deformed enlargement of the lip diameter.

In the intermediate stage of the ramming and staking operation as shown in FIG. 3, the clinching or locking groove 24 of the nut 12 is not yet filled with displaced sheet metal material and the leading edge of the nut lip 22 has just reached the annular seat 34 of the lower staking die 30 and the cam 22 has begun the outward displacement of the lip 22. Thereafter, the continued downward ramming of the nut 12 from the position in FIG. 3 to the position in FIG. 4 forces the nut lobes 26 to displace and cold-deform the aperture periphery 18 of the sheet metal radially inwardly to completely fill the annular nut locking groove 24 as the lobes 26 become embedded in the cold-deformed sheet metal periphery 18'. In addition, the cam 32 has radially outwardly displaced the annular nut lip 22' and the displaced lip material has been radially guided along the surface of the die seat 34 so that the deformed lip 22' has become staked beneath and reinforces the mechanical interlock of the sheet metal periphery 18' within the annular locking groove 24. Furthermore, the deformed aperture periphery of the sheet metal 18' is not only radially displaced inwardly within the groove 24 but is also clamped between the annularly staked lip 22' below and the annular pattern of nut lobes 26 above, so that the resulting reinforced securement of the mechanically interlocked nut and sheet metal joined at 10' are particularly resistant in subsequent use not only to vertical stress forces but to side load or shear forces which can loosen previous joint structures. Moreover, the annular die seat 34 ensures that the staked lip 22' is coplanar or flush with the undersurface of the sheet metal 14 so that the continuous, smooth undersurface 11 of the joint 10' eliminates projection of the nut lip 22' from the joint and eliminates any consequent interference or catching thereon of tools or materials in subsequent operations and use of the fastened sheet metal.

While particular embodiments of the joint assembly and tooling apparatus of the invention have been shown and described in detail, it will be obvious to those skilled in the art that changes and modifications in various aspects may be made without departing from the invention in its broader aspects, some of which changes and modifications being matters of routine engineering or design, and others being apparent only after study. As such, the scope of the invention is not limited by the particular embodiment and specific construction described herewith but is defined by the appended claims and equivalents thereof. Accordingly, the aim in the appended claims is to cover all such changes and modifications as fall within the true spirit and scope of the invention.

The invention is claimed as follows:

1. A joint assembly in which a fastener of the self-clinching type is secured to an apertured sheet material, comprising: a fastener including a head and shank portion with a locking groove formed in said shank; a generally planar-surfaced, apertured sheet material; said fastener shank portion projecting through said aperture and said fastener head at least partially embedded within peripheral material surrounding said sheet material aperture, and a portion of said peripheral material is disposed within said groove to form a mechanical interlock therewith to secure said joint assembly; said shank comprising an outwardly flared end portion having an exposed surface thereof coplanar with an exposed, opposite surface of said sheet material in relation to said embedded fastener head.

2. A joint assembly according to claim 1 wherein said shank end portion comprises an annular configuration.

3. A joint assembly according to claim 1 wherein said shank end portion is radially outwardly flared with respect to a contiguous medial shank portion, such that a second portion of said peripheral sheet material is clamped between said fastener head and said flared shank end portion in order to promote securement of said joint assembly in addition to said grooved mechanical interlock.

4. A joint assembly according to claim 1 wherein said shank end portion includes a conical configuration.

5. A joint assembly according to claim 4 wherein said conical configuration tapers towards said fastener head.

6. A joint assembly according to claim 1 wherein said fastener head includes a plurality of radially disposed projections embedded into said peripheral material in order to prevent relative rotation therebetween.

7. A method of forming a fastener joint assembly, comprising the steps of: providing a section of apertured sheet material; providing a fastener including a head and a shank portion having a sizing ring formed at one end of the shank and a medial, locking groove formed on said shank; engaging said sizing ring with the peripheral material surrounding the aperture of said sheet material; forcing said sizing ring to deform a portion of said aperture peripheral material to resize said aperture diameter; displacing a portion of said aperture peripheral material radially inwardly into said groove to cold-form a mechanical interlock therewith; and radially outwardly deforming said sizing ring into underlying relationship with respect to said aperture peripheral material; and clamping said aperture peripheral material between said deformed sizing ring and said fastener head in order to further secure said joint assembly.

8. A method according to claim 7 further comprising deforming an exposed surface of said deformed sizing ring into coplanar relationship with the exposed surface of said sheet material opposite said fastener head.

9. A method according to claim 7 further comprising embedding a plurality of radially disposed projections on said fastener head into said aperture peripheral material in order to prevent relative rotation therebetween.

* * * * *